(12) United States Patent
Ichijo et al.

(10) Patent No.: US 11,766,064 B2
(45) Date of Patent: Sep. 26, 2023

(54) PEELING DEVICE

(71) Applicant: ASTRA Co., LTD., Fukushima (JP)

(72) Inventors: Hirotaka Ichijo, Fukushima (JP);
Takahiro Karino, Fukushima (JP);
Akihiro Sato, Fukushima (JP)

(73) Assignee: ASTRA CO., LTD., Fukushima (JP)

( * ) Notice: Subject to any disclaimer, the term of this patent is extended or adjusted under 35 U.S.C. 154(b) by 294 days.

(21) Appl. No.: 17/418,513

(22) PCT Filed: Aug. 15, 2019

(86) PCT No.: PCT/JP2019/032004
§ 371 (c)(1),
(2) Date: Jun. 25, 2021

(87) PCT Pub. No.: WO2020/208840
PCT Pub. Date: Oct. 15, 2020

(65) Prior Publication Data
US 2022/0061373 A1 Mar. 3, 2022

(30) Foreign Application Priority Data

Apr. 12, 2019 (JP) .................................. 2019-076076

(51) Int. Cl.
*A23N 7/02* (2006.01)
*A23N 7/00* (2006.01)
(Continued)

(52) U.S. Cl.
CPC ............. *A23N 7/026* (2013.01); *A23N 7/002* (2013.01); *A23N 7/10* (2013.01); *B26D 3/282* (2013.01); *B26D 2210/02* (2013.01)

(58) Field of Classification Search
CPC .......... A23N 7/026; A23N 7/02; A23N 7/002; A23N 7/08; A23N 7/10; B26D 2210/02; B26D 3/282
See application file for complete search history.

(56) References Cited

U.S. PATENT DOCUMENTS

| 50,671 A | * | 10/1865 | Alexander | ............. | A23N 7/026 |
| | | | | | 99/584 |
| 331,451 A | * | 12/1885 | Scott | ...................... | A23N 7/026 |
| | | | | | 99/593 |

(Continued)

FOREIGN PATENT DOCUMENTS

| JP | S5729278 A | 2/1982 |
| JP | S60225517 A | 11/1985 |

(Continued)

OTHER PUBLICATIONS

International Search Report (ISR) dated Nov. 5, 2019, issued for International application No. PCT/JP2019/032004. (1 page).

*Primary Examiner* — Sean M Michalski
(74) *Attorney, Agent, or Firm* — Law Office of Katsuhiro Arai

(57) ABSTRACT

A peeler blade (102) of a peeler (101) is made to swing such as to come into contact with and separate from a virtual axial line of a peeler shaft (111) by a tension state of an urging member (148) being adjusted based on a rotation angle difference between the peeler shaft (111) and a center shaft (141). Peeling is performed from an upper portion side of a fruit or vegetable that is supported by a fruit and vegetable holder (161), on a counter-peeler driving section arrangement side in relation to a virtual axial line of the fruit and vegetable holder (161). The peeling device is made for, for example, peeling a fruit or vegetable having hard skin such as a pineapple.

3 Claims, 9 Drawing Sheets

(51) Int. Cl.
*A23N 7/10* (2006.01)
*B26D 3/28* (2006.01)

(56) References Cited

U.S. PATENT DOCUMENTS

| | | | | |
|---|---|---|---|---|
| 1,467,616 A * | 9/1923 | Forry | ............. | A23N 7/08 |
| | | | | 99/623 |
| 1,837,335 A * | 12/1931 | Reinstein | ............. | A23N 4/14 |
| | | | | 99/596 |
| 1,872,731 A * | 8/1932 | Goranson | ............. | A23N 7/026 |
| | | | | 99/593 |
| 3,382,900 A * | 5/1968 | De Back | ............. | A23N 7/002 |
| | | | | 99/542 |
| 3,473,588 A * | 10/1969 | Loveland | ............. | A23N 4/20 |
| | | | | 99/589 |
| 3,552,459 A * | 1/1971 | Vadas | ............. | A23N 4/20 |
| | | | | 99/588 |
| 4,109,021 A * | 8/1978 | Loveland | ............. | A23N 7/002 |
| | | | | 99/589 |
| 4,546,545 A * | 10/1985 | Hirano | ............. | B26D 3/26 |
| | | | | 99/545 |
| 4,606,263 A * | 8/1986 | Ross | ............. | A23N 7/002 |
| | | | | 99/542 |
| 4,834,795 A * | 5/1989 | Raub | ............. | A23N 4/20 |
| | | | | 99/589 |
| 5,957,045 A * | 9/1999 | He | ............. | A47J 17/16 |
| | | | | 99/593 |
| 6,516,713 B1 * | 2/2003 | Holmander | ............. | A47J 17/16 |
| | | | | 99/590 |
| 6,523,464 B1 * | 2/2003 | Widelo | ............. | A23N 7/026 |
| | | | | 99/593 |
| 2010/0122614 A1 * | 5/2010 | Waterman | ............. | B27H 5/00 |
| | | | | 29/402.06 |
| 2017/0252936 A1 * | 9/2017 | Cheung | ............. | B26D 1/02 |
| 2018/0055268 A1 * | 3/2018 | Ju | ............. | A23N 7/026 |
| 2019/0037905 A1 * | 2/2019 | Ichijo | ............. | A23N 7/026 |
| 2019/0291291 A1 * | 9/2019 | Shengli | ............. | B26D 3/26 |
| 2020/0337353 A1 * | 10/2020 | Abdallah | ............. | A47J 19/06 |
| 2022/0061373 A1 * | 3/2022 | Ichijo | ............. | B26D 3/282 |

FOREIGN PATENT DOCUMENTS

| | | |
|---|---|---|
| JP | 2016096744 A | 5/2016 |
| JP | 2017205055 A | 11/2017 |
| KR | 200354739 Y1 | 6/2004 |

\* cited by examiner

PEELING DEVICE

CROSS-REFERENCE TO RELATED APPLICATIONS

This application is the U.S. National Phase under 35 U.S.C. § 371 of International Application PCT/JP2019/032004, filed Aug. 15, 2019, which claims priority to Japanese Patent Application No. JP2019-076076, filed Apr. 12, 2019. The International Application was published under PCT Article 21(2) in a language other than English.

TECHNICAL FIELD

The present invention relates to a peeling device that is suitable for work of peeling a pineapple.

BACKGROUND ART

Since the past, in a process for peeling skin during processing treatment of fruit and vegetables, such as persimmons, apples, and oranges, peeling devices of various configurations have been used to enable the processing treatment to be quickly and easily performed.

A fresh pineapple that is commonly sold as fruit and vegetable is a cocoon-shaped fruit that is composed of a cluster of small berries. The skin of tire pineapple is hard, thick, and uneven in a scale-like manner. Therefore, since the past, a peeling machine that is configured to easily remove the skin and a core portion of a pineapple in a following manner has been used (Patent Literature 1). That is, a top portion that is atop the fruit and referred to as a crown and a bottom portion are cut off such that a barrel shape is formed. The fruit is then arranged on a base. A cutter that includes an inner blade and an outer blade that are circular cylindrical in shape and arranged in a concentric manner is moved along a core direction, from a top surface of the barrel-shaped fruit of the pineapple (referred to, hereafter, as a "pineapple fruit") towards a bottom-surface direction.

The inventors of the present application have also developed a peeling device (refer to Patent Literature 2). The peeling device includes: a work supporting section in which a work holder that supports a fruit or vegetable to be peeled is arranged such as to freely rotate by driving of a work rotation motor, and a peeler driving section that includes a peeler shaft that moves a peeler along an outer periphery of the fruit or vegetable that is supported by the work holder by driving of a peeler rotation motor, and a center shaft that is arranged coaxially with the peeler shaft, provided with an urging member between the center shrift and the peeler, and rotates by driving of a shaft rotation motor, in which the peeler driving section is configured to be capable of swinging the peeler blade of the peeler such that the peeler blade comes into contact with and separates from a virtual axial line of the peeler shaft by adjusting a tension state of the urging member based on a rotation angle difference between the peeler shaft and the center shaft.

Patent Literature 1: Japanese Patent Laid-open Publication No. Showa 57-29278

Patent Literature 2: Japanese Patent Laid-open Publication No. 2016-096744

SUMMARY OF THE INVENTION

Problem to be Solved by the Invention

However, when the skin and the core portion of the pineapple fruit are removed by the cutter that includes the circular cylindrical blades and only a receptacle portion for eating and drinking (referred to, hereafter, as flesh) remains, as in Patent Literature 1, a shape that is obtained as a result is a circular cylinder that has a hole. An extremely large portion, such as the flesh near the skin, is discarded.

In addition, the peeling device disclosed in Patent Literature 2 is based on an assumption of fruit and vegetables that have relatively thin skin, such as persimmons, apples, oranges, and turnips, and is configured for peeling such skin with a peeler. Therefore, although, as a result of the skin of the pineapple fruit from which the top portion and the bottom portion of the fruit have been cut off and that has the barrel shape being peeled by the peeler, a discarded amount of the fruit during the peeling work can be significantly reduced, further improvement is required for the hard, thick, uneven scale-like skin of the pineapple fruit to be reliably peeled.

Here, tire present invention has been achieved in light of such issues. An object of the present invention is to provide a peeling device tint is configured to be capable of reliably and easily peeling a fruit or vegetable tint has hard skin, such as a pineapple.

Means for Solving Problem

To achieve the above-described object, a peeling device of the present invention includes: a fruit and vegetable supporting section in which a fruit and vegetable holder that supports a fruit or vegetable to be peeled is arranged such as to freely rotate by driving of a fruit and vegetable rotation motor, a peeler driving section that includes a peeler shaft that moves a peeler along an outer periphery of the fruit or vegetable that is supported by the fruit and vegetable holder by driving of a peeler rotation motor, and a center shaft that is inserted into the peeler shaft and arranged coaxially with the peeler shaft, in which a tip flange plate that is provided on one end that faces further towards the fruit and vegetable supporting section side than the peeler shaft is provided with an urging member between the center shaft and the peeler, and the center shaft rotates by driving of a shaft rotation motor, and a control unit that controls driving of the fruit and vegetable rotation motor, the peeler rotation motor, and the shaft rotation motor. A peeler blade is made to swing such as to come into contact with and separate from a virtual axial line of the peeler shaft by a tension suite of the urging member being adjusted based on a rotation angle difference between the peeler shaft and the center shaft, and peeling is performed from an upper portion side of the fruit or vegetable that is supported by the fruit and vegetable holder, on a counter-peeling driving section arrangement side in relation to a virtual axial line of the fruit and vegetable holder.

The peeling device that is configured as described above is capable of orienting a direction of force that acts on the peeler blade of the peeler towards an inner side of the fruit or vegetable, at all times. Therefore, the peeler blade cutting into the fruit or vegetable can be assisted. Consequently, peeling can be reliably performed even for a fruit or vegetable that has hard skin, such as a pineapple.

In addition, in the peeler, a pair of peeler arms that support the peeler blade and have an arm-like shape are swingably connected by a pair of hinges to a peeler attachment plate that is arranged in the peeler shaft. The peeler driving section includes a tilt restricting means that is capable of restricting tilting of the peeler during non-contact with the fruit or vegetable.

Specifically, the tilt restricting means is composed of a tilt restricting section that is provided in the peeler and a cam section of the tip flange plate that is capable of engaging with the tilt restricting section. When the peeler shaft and the center shaft are rotated in a state in which the tilt restricting section and the cam section are engaged, and the peeler blade moves above a peeling start position on the fruit or vegetable that is supported by the fruit and vegetable holder, the peeler driving section rotates only the center shaft, cancels the engagement between the tilt restricting section and the cam section, and makes the peeler blade of the peeler approach the virtual axial line of the peeler shaft by the urging member.

When a cocoon-shaped fruit or vegetable such as a pineapple is peeled, when an intermediate portion in a height direction of the fruit or vegetable is peeled, the peeling blade is particularly in linear contact with the fruit or vegetable. Therefore, a peeler that has a larger peeling blade with a long blade length, and longer peeler arms that place the peeler blade in contact with the upper portion of the fruit or vegetable, beyond the holder, on the counter-peeler driving section arrangement side in relation to the virtual axial line of the fruit and vegetable holder is used.

The peeler is attached to the peeler attachment plate by the hinges, such as to freely swing. However, because the peeler has a certain amount of weight, in a state in which the peeler is not in contact with the fruit or vegetable (during non-contact with the fruit or vegetable), depending on a rotation position of the peeler shaft and the like, the peeler may tilt in a virtual peeler shaft direction with the hinges as an axis, as a result of the own weight thereof.

Preventing tilting through adjustment of tensile force of the urging member can be considered. However, when the working of the urging member is strengthened, the peeler blade may be excessively pressed against the fruit or vegetable during peeling. The peeler blade may cut into the fruit or vegetable, and the fruit or vegetable may become damaged.

As a result of the peeling device that includes the tilt restricting means, configured as described above, as a result of the peeler driving section including the tilt restricting means that is capable of restricting the tilting of the peeler during non-contact with the fruit or vegetable, a heavy peeler that is large in size can be mounted. For example, even when the peeler shaft is rotated to a highest position and the peeler is positioned above the fruit or vegetable, a situation in which the peeler tilts towards a virtual peeler rotation axis direction with the hinges as an axis as a result of the own weight thereof can be prevented. In addition the urging member can be determined taking into consideration only the cut-in state of the peeler blade into the fruit or vegetable. Therefore, the peeling work is unhindered, and the fruit or vegetable is not damaged.

Furthermore, in the peeling device of the present invention, the fruit and vegetable holder includes a holder main body in which a fruit and vegetable pin is connected to one end in an upper portion of a housing of a fruit and vegetable rotation shaft that is erected such as to freely rotate in the housing in which the fruit and vegetable supporting section is arranged, and a fruit and vegetable mounting member that is arranged such as to freely slide in an upward/downward direction of the holder main body, in which the fruit and vegetable pin protrudes such as to freely rotate from a center of an upper surface thereof, and with which a bottom end of the fruit or vegetable to be peeled that is impaled on the fruit and vegetable pin comes into contact. A removal mechanism for removing the fruit or vegetable from the fruit and vegetable pin is configured by the fruit and vegetable mounting member and a slide operating section that moves the fruit and vegetable mounting member in a sliding manner in the upward/downward direction of the holder main body.

That is, as a result of the slide operating section being operated and the fruit and vegetable mounting member rising while sliding over an outer periphery of the holder main body, the fruit to be peeled that has been peeled is lifted in a direction of removal from the fruit and vegetable pin. In this way, work of an initial motion to remove the fruit to be peeled from the fruit and vegetable pin is assisted. As a result, the overall work can be simplified. In addition, during the initial motion of removing the peeled fruit to be peeled from the fruit and vegetable pin, a situation in which the frail is gripped with strong force or a pulling force is applied thereto, and the fruit becomes damaged can also be prevented.

Specifically, as the slide operating section, a lever member in which an open end is an operating section, the other end is a fixed section that is connected to the fruit and vegetable mounting member by a rotation connecting section such as to freely rotate, and in the middle of both ends is a swing supporting section that is supported by the housing in which the fruit and vegetable holder is provided, can be used.

EFFECTS OF THE INVENTION

As described above, in the peeling device of the present invention, peeling of a fruit or vegetable that has hard skin, such as a pineapple, can be reliably and easily performed.

Figure 1:
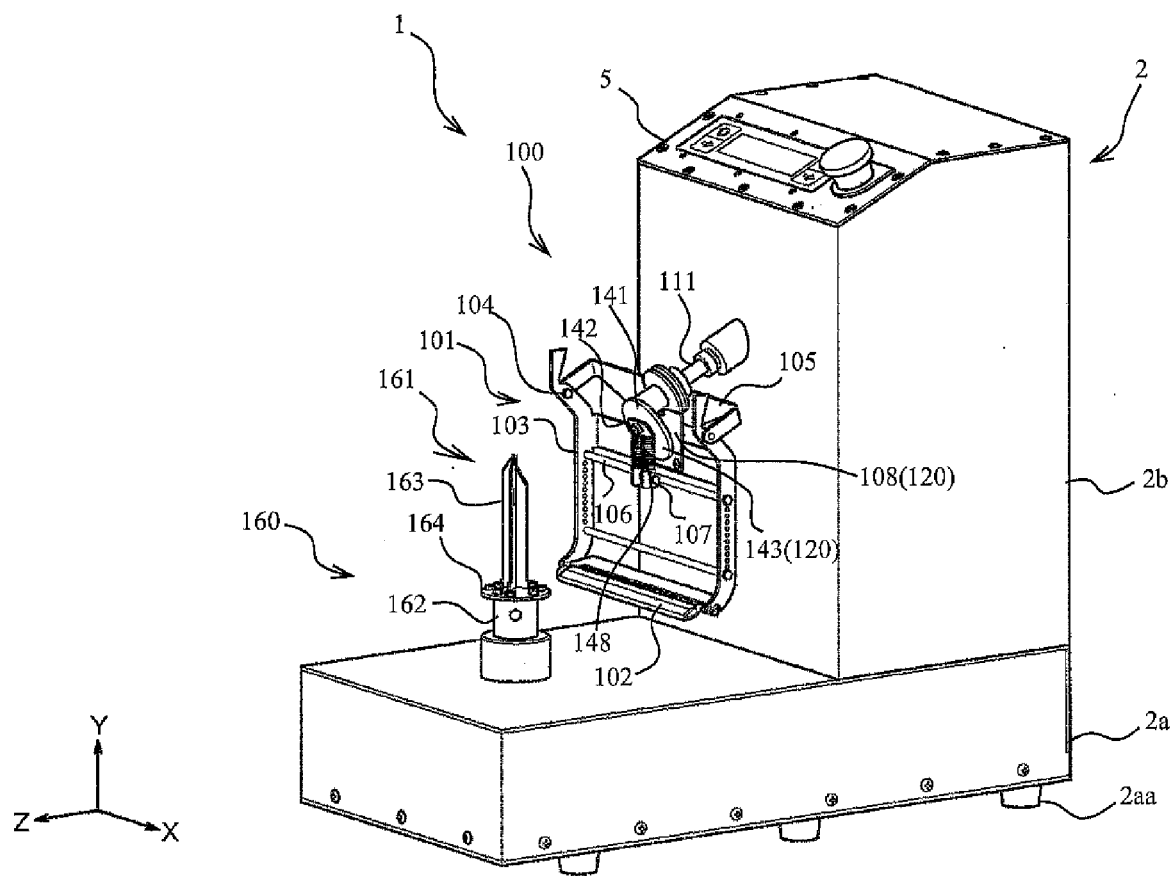
FIG. 1 is a perspective view of an outer appearance of main sections of a peeling device according to a first embodiment of the present invention.

EXPLANATIONS OF LETTERS OR NUMERALS 1 device main body
2 housing
2a base housing section
2aa leg
2b tower housing section
3 rack
5 input operating section
7 power supply switch
100 peeler driving section
101 peeler
102 peeler blade
103 peeler arm
104 hinge
105 peeler attachment plate
106 peeler rib
107 urging member engaging section
108 tilt restricting section
111 peeler shaft
113 peeler shaft pulley
114 tension belt
120 tilt restricting means
130 shaft rack
141 center shaft
142 tip flange plate
143 cam section
144 shaft axis pulley
145 tension belt
147 urging member connecting section
148 urging member (coil spring)
160 fruit and vegetable supporting section
161 fruit and vegetable holder
162 holder main body
163 fruit and vegetable pin
165 fruit and vegetable rotation shaft
166 fruit and vegetable pulley
167 fruit and vegetable rotation motor
167a rotation shaft
168 motor pulley
169 timing belt
170 fruit and vegetable mounting member
172 slide operating section
173 lever member
173a operating section
173b fixed section
173c swing supporting section
174 stay member
180 removal mechanism
200 control unit

DETAILED DESCRIPTION OF EMBODIMENTS

First, a peeling device according to a first embodiment will be described with reference to FIG. 1 to FIG. 7.

Figure 2:
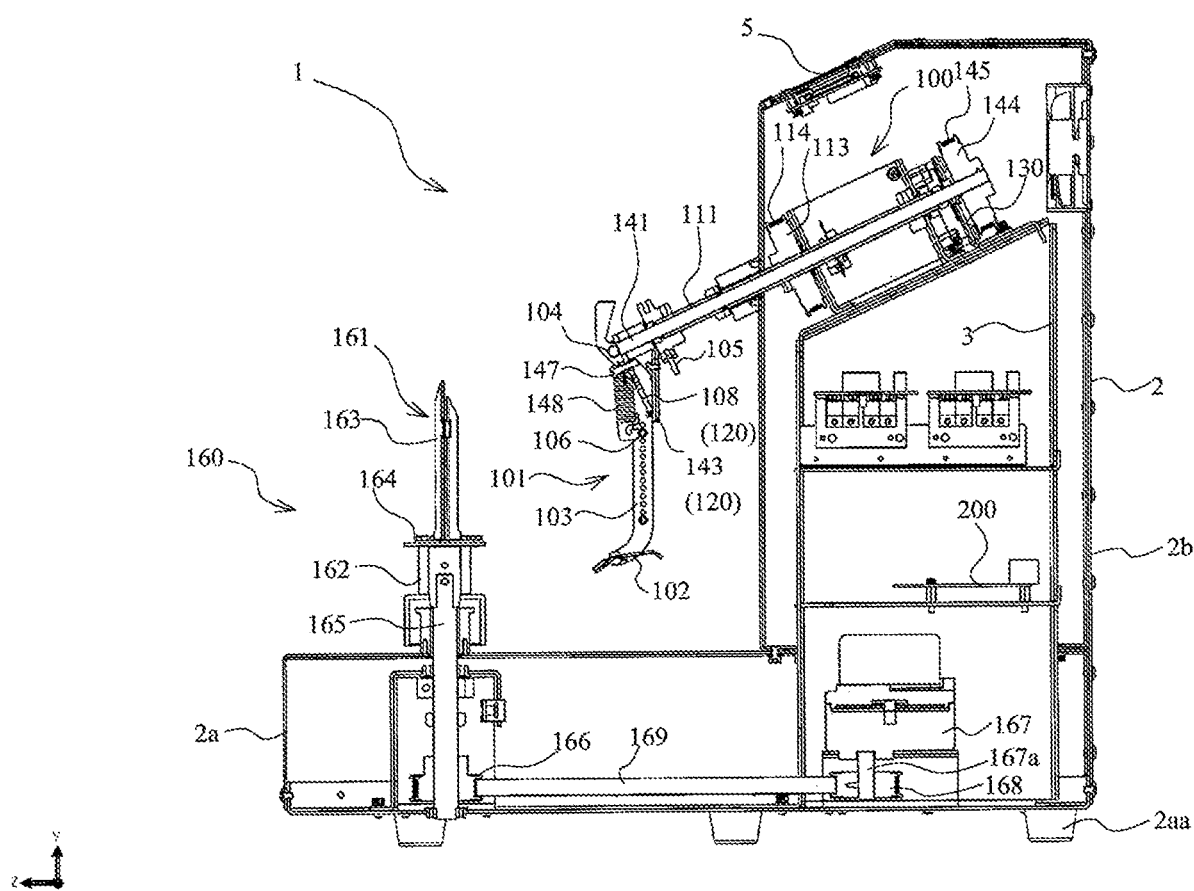
FIG. 2 is a vertical cross-sectional view of the main sections of the peeling device according to the first embodiment of the present invention.
Figure 3:
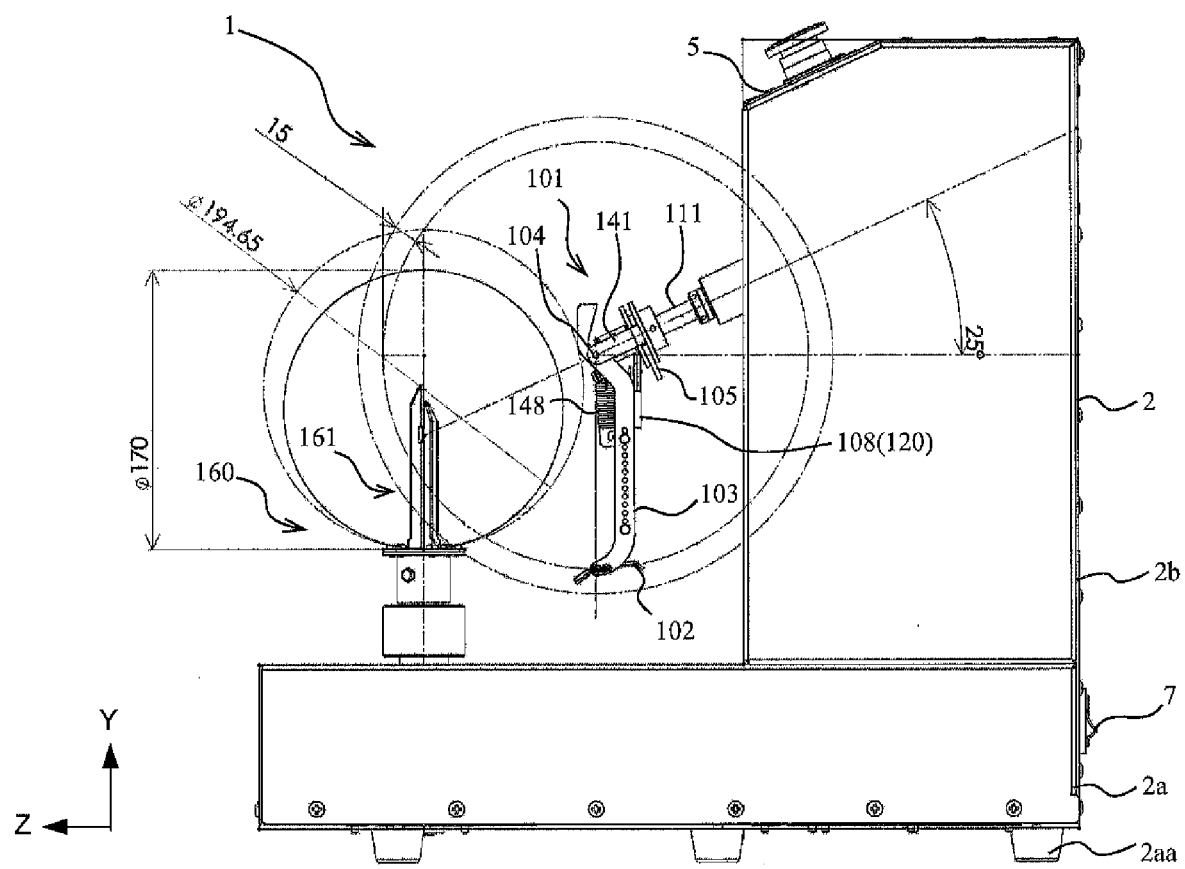
FIG. 3 is a startup dimension diagram of the peeling device according to the first embodiment of the present invention (unit: mm).
Figure 4:
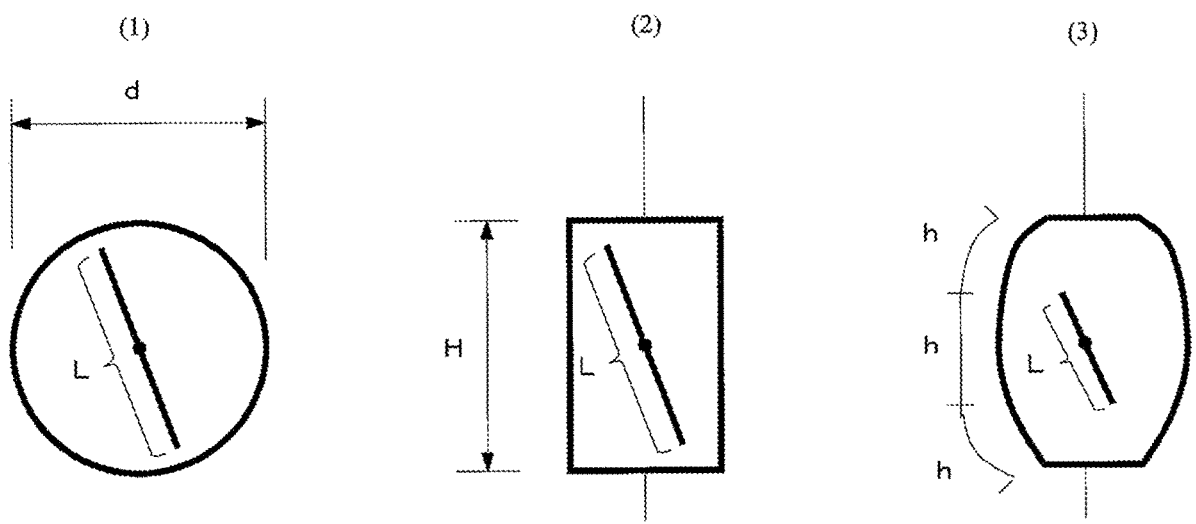
FIG. 4 is an explanatory diagram related to a blade length of a peeler that is used in the peeling device according to the first embodiment of the present invention in which (1) indicates that peeling can be performed even when d>L, (2) indicates that peeling cannot be performed when H>L, and θ<L is preferred, and (3) indicates that h<L is preferred (h being an approximation straight line).

The peeling device according to the present embodiment is a peeling device 1 that peels a pineapple fruit in which a top portion and a bottom portion of the fruit has been cut off to form a barrel shape that has a height of about 100 mm to 180 mm and a diameter of about 100 mm to 180 mm. As shown in FIG. 1 to FIG. 3, tire peeling device 1 includes a housing 2 that is configured by a base housing section 2a and a tower housing section 2b. The base housing section 2a has a substantially rectangular shape and is placed horizontally using leg sections 2aa for mounting. The tower housing section 2b has a substantially rectangular shape and is placed vertically. The tower housing section 2b is provided on one end side of the base housing section 2a in a length direction thereof.

A fruit and vegetable supporting section 160 is configured on the other end side of the base housing section 2a in the length direction. A fruit and vegetable holder 161 that supports the pineapple fruit in a peelable manner is arranged such as to freely rotate around a vertical axis direction.

In the fruit and vegetable holder 161 according to the present embodiment, a fruit and vegetable pin 163 is arranged in the center of an upper surface of a circular disk-shaped pin base 164 that is formed in an upper portion of a holder main body 162 that is formed into a circular cylindrical shape. The fruit and vegetable pin 163 is formed into a cross shape from a planar view as a fixing pin that pierces the pineapple fruit. In addition, the fruit and vegetable holder 161 is provided such as to be freely detachable in one end portion of a fruit and vegetable rotation shaft 165 that protrudes vertically towards a surface of the base housing section 2a. The fruit and vegetable rotation shaft 165 is supported such as to freely rotate over a top surface and a rear surface of the base housing section 2a.

Here, diameter dimensions of the holder main body 162 and the pin base 164 are designed such as to be sufficient for holding the pineapple fruit, but sufficiently smaller than a minimum diameter of the barrel-shaped pineapple fruit, and such that neither the holder main body 162 nor the pin base 164 interferes with a peeler blade 102 of a peeler 101, described hereafter, during peeling. In addition, the fruit and vegetable pin 163 is configured as a pin that is similar to a cross-shaped sword that corresponds to a diameter of a core (substantially fixed regardless of the size of tire pineapple fruit). As a result, holding force that is sufficient for peeling is achieved, and the fruit of the pineapple fruit is not damaged.

Inside the base housing section 2a, on the other end portion of the fruit and vegetable rotation shaft 165, a single fruit and vegetable pulley 166 that includes a configuration for restricting rotation in one direction (such as a one-way clutch mechanism) is provided.

Furthermore, the fruit and vegetable supporting section 160 includes a fruit and vegetable rotation motor 167. According to the present embodiment, the fruit and vegetable rotation motor 167 is provided on a base that is provided in an inner bottom portion of the base housing section 2a that serves as a lower portion of the lower housing section 2b. A rotation shaft 167a of the fruit and vegetable rotation motor 167 extends vertically towards the inner bottom portion of the base housing section 2a. A single motor pulley 168 is provided in the rotation shaft 167a.

In addition, a single timing belt 169 is looped between the fruit and vegetable pulley 166 and the motor pulley 168. The configuration is such that driving force in one direction of the fruit and vegetable motor 167 is transmitted to the motor pulley 168, and the pineapple fruit is rotated together with the frail and vegetable holder 161.

In addition, a rack 3 is provided inside the tower housing section 2b, such as to pass through an upper surface of the base housing section 2a. The fruit and vegetable rotation motor 167 is housed inside a bottommost level of this rack 3. A shaft rack 130 of a peeler driving section 100 is provided on a topmost surface of the rack 3. The peeler driving section 100 enables the peeler 101 that includes the peeler blade 102 to freely come into contact with and separate from the pineapple fruit that is supported by the fruit and vegetable holder 161 and holds the peeler 101 such as to freely rotate along the outer periphery of the pineapple fruit.

The peeler driving section 100 includes a hollow peeler shaft 111 that freely rotates by driving of a peeler rotation motor (not shown) that is mounted in the shaft rack 130. The peeler shaft 111 is supported by the shaft rack 130 that is provided on the upper surface of the rack 3 such as to protrude from a surface of the tower housing section 2b that opposes the fruit and vegetable holder 161. The peeler shaft 111 is capable of rotating by receiving driving force of the peeler rotation motor that is transmitted via a drive transmission system that is composed of a tension belt 114 that is looped between a motor pulley (not shown) that is provided in a rotation shaft of the peeler rotation motor (not shown) that is mounted in the shaft rack 130 and a peeler shaft pulley 113 that is provided in the peeler shaft 111. In addition, a rotation amount detecting means (not shown) is provided in the peeler shaft 111 and is capable of detecting rotation by first to fifth angles, described hereafter.

In addition, according to the present embodiment, the upper surface of the rack 3 on which the shaft rack 130 is provided is formed to be tilted, such as to be oriented towards a center direction of the pineapple fruit that is held by the fruit and vegetable holder 161, while an elevation angle of the hollow peeler shaft 111 that freely rotates by driving of the peeler rotation motor from a surface that is orthogonal to an axial direction of the fruit and vegetable holder 161 (a surface that is parallel to the upper surface of the base housing section) is 25°.

Therefore, a tip end portion of the peeler shaft 111 protrudes from the surface of the tower housing section 2b that opposes the fruit and vegetable holder 161 at the elevation angle of 25° from the tower housing section 2b, and faces the fruit and vegetable supporting section 160 side. In addition a peeler attachment plate 105 is provided in the tip end portion of the peeler shaft 111 such as to be freely detached. The peeler attachment plate 105 swingably supports the peeler 101 such that the peeler blade 102 come into contact with and separate from a virtual axial line of the peeler shaft 111.

Here, the peeler 101 includes the peeler blade 102, a pair of peeler arms 103, the peeler attachment plate 105, and a peeler rib 106. The peeler arms 103 have an arm-like shape and support the peeler blade 102 such as to be capable of swinging along the surface of the pineapple fruit. The peeler attachment plate 105 connects base end portions of the peeler arms 103 by a pair of hinges 104. The peeler rib 106 has a thin shaft-like shape and is provided between both arms such as to extend in parallel with the peeler blade 102.

A blade length L of the peeler blade 102 will be described. In general, ideal shapes of an object to be peeled are a "sphere" and a "circular cylinder." When the object to be peeled is a "sphere" as shown in (1) in FIG. 4, even when a diameter d of the sphere is greater than the blade length L of the peeler blade 102, because point contact is basically achieved, the skin can be peeled should the blade length L be longer in relation to a straight line that appears when the peeler blade 102 scrapes the sphere. On the other hand, when the object to be peeled is a "circular cylinder" as shown in (2) in FIG. 4, when a height H of the circular cylinder is greater than the blade length L of the peeler blade 102, an area that is longer than the peeler blade 102 is in linear contact and cannot be peeled. However, as shown in (3) in FIG. 4, because the barrel-shaped pineapple fruit gently narrows at the top and the bottom, conditions are more relaxed compared to when the object to be peeled is a circular cylinder. The skin can be peeled as long as the blade length L of the peeler blade 102 is longer than an approximation straight line h.

From the foregoing, the blade length L of the peeler blade 102 is selected such that a contact point on the fruit or vegetable surface on a contact trajectory is within the range of the blade length L of the peeler blade 102 at all times, and a width of linear contact does not exceed the blade length L of the peeler blade 102.

Next, regarding the peeler blade 102 itself, because the skin of the pineapple fruit is hard, thick, and uneven in a scale-like manner, as described above, the skin generates significant resistance during peeling and the peeler blade 102 may become damaged. Therefore, a rake amount (angle, level difference, and width of space) of the peeler blade 102 is designed such that about ¼ to ⅓ of an amount of unevenness of the skin is cut at once. The peeler blade 102 that is designed to remove the skin up to a deepest portion of recessing portions of the skin by being advanced to make three or four laps is used.

Figure 5:
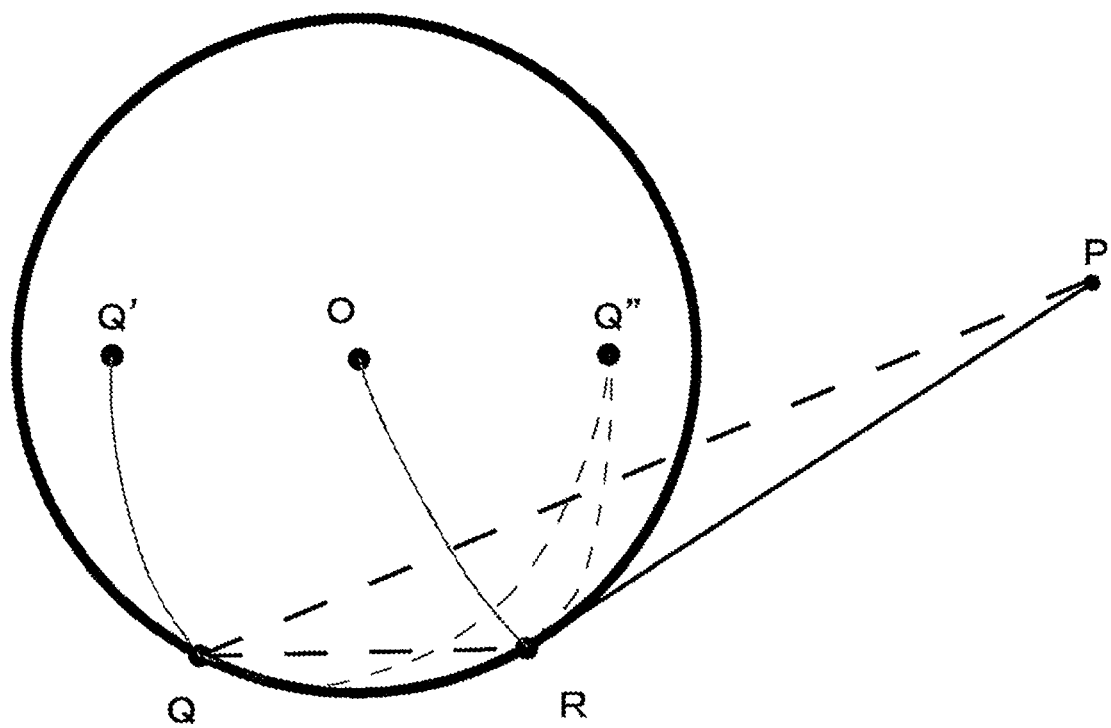
FIG. 5 is an explanatory diagram related to a trajectory of a peeler blade in the peeling device according to the first embodiment of the present invention.

The peeler arms 103 will also be described. In the peeling device 1 according to the present embodiment, because the object to be peeled is the barrel-shaped pineapple fruit, peeling by the peeler blade 102 being placed in contact with upper and lower apex portions of the fruit is not necessary. Therefore, as shown in FIG. 5, a start position Q' for peeling is a position that is separated from a fruit and vegetable apex portion O. Meanwhile, in a position Q at which a contact portion of the peeler blade 102 is substantially at a side surface, as described above, a rotation axis line of the peeler 101 is required to be shifted upward such that an end portion of a differential straight line h to which a peeling thickness and the barrel shape are related does not deviate from the range of the blade length L of the peeler blade 102. In addition, in a peeling end position Q", a bottom-portion unpeeled diameter based on a radius OQ" in relation to the diameter dimension of the holder main body 162 is required to be sufficiently small. Taking the foregoing into consideration, a position of a fulcrum portion P and an arm length PQ are determined such that the peeler blade 102 passes through a trajectory of a curved line Q'-Q-Q". Here, in FIG. 5, a curved line O-R-Q" indicates a trajectory of the peeler blade 102 when peeling is required to performed in the top apex portion of the fruit or vegetable as well, the fruit or vegetable being a substantially spherical fruit or vegetable such as a persimmon.

In addition, according to the present embodiment, in the peeler 101, a plate-shaped tilt restricting section 108 is provided further towards the hinge 104 side than the peeler rib 106. The tilt restricting section 108 configures a tilt restricting means 120 that is capable of restricting tilting of the peeler 101 during non-contact with the fruit or vegetable.

Here, the peeling device 1 according to the present embodiment may include a configuration that enables adjustment of a position and a tilt angle of the peeler shaft 111. For example, the configuration may be such that, with the upper surface of the rack 3 as a flat surface, the shaft rack 130 is supported by a supporting member (not shown), and the shaft rack 130 together with the supporting member can be moved in the height direction of the tower housing section 2b, and moved in the length direction of the base housing section 2a, thereby adjusting the tilt angle (elevation angle) of the peeler shaft 11 between 20° to 25°.

In addition, the peeler driving section 100 has a center shaft 141 that can freely rotate by driving of a shaft rotation motor. The center shaft 141 extends on a same axis as the peeler shaft 111 inside a shaft hole of the peeler shaft 111. One end of the center shaft 141 further protrudes from the peeler attachment plate 105. The center shaft 141 is supported by the shaft rack 130 such as to face the fruit and vegetable supporting section 160 side.

The center shaft 141 is a rotation shaft for operating a coil spring 148 that serves as an urging member for placing the peeler 101 in contact with the pineapple fruit. The center shaft 141 is capable of rotating by receiving driving force of the shaft rotation motor that is transmitted via a drive transmission system that is composed of a tension belt 145 that is looped between a motor pulley (not shown) that is provided in a driving shaft of the shaft rotation motor (not shown) that is mounted in the shaft rack 130 and a shaft axis pulley 144 that is provided in the center shaft 141. In addition, a rotation amount detecting means (not shown) is provided in the center shaft 141 and is capable of detecting rotation by the first to fifth angles, described hereafter.

In addition, a tip flange plate 142 is provided on one end of the center shaft 141 that faces the fruit and vegetable supporting section 160 side from the peeler attachment plate 105. According to the present embodiment, a cam section 143 is formed in the tip flange plate 142. The cam section 143 configures the tilt restricting means 120 that is capable of restricting the tilting of the peeler 101 during non-contact with the fruit or vegetable, and is capable of engaging with the tilt restricting section 108.

Furthermore, an urging member connecting section 147 is formed in the tip flange plate 142. One end of the coil spring 148 is connected to the urging member connecting section 147. The coil spring 148 is stretched between the urging member connecting section 147 and the peeler rib 106 of the peeler 101. The tension state of the coil spring 148 is changed by the rotation of the center shaft 141 and/or the peeler shaft 111. In addition, the coil spring 148 enables adjustment of the state of connection/separation of the peeler 100 in relation to the pineapple fruit.

In addition, the peeler driving section 100 is configured such that, when the peeler shaft 111 and the center shaft 141 are synchronized and rotated in a state in which the tilt restricting section 108 and the cam section 143 are engaged, and the peeler blade 102 is moved above the peeling start position of the pineapple fruit that is supported by the fruit and vegetable holder 161, only the center shaft 141 is rotated, and the engagement between the tilt restricting section 108 and the cam section 143 is canceled. In addition, the peeler blade 102 of the peeler 101 is made to approach the virtual axial line of the peeler shaft 111 by the coil spring 148, and placed in contact with the pineapple fruit.

In addition, the peeling device 1 includes a control unit 200. The control unit 200 determines detection results of the rotation amount detecting means of the peeler shaft 111 and the rotation amount detecting means of the center shaft 141, described above, and controls respective driving (speed, rotation amount, synchronization, and the like) of the peeler rotation motor, the shaft rotation motor, and the fruit and vegetable rotation motor 167.

Here, according to the present embodiment, a switch that serves as an adjustment input means for driving (speed) of the fruit and vegetable rotation motor 167, a switch that serves as an adjustment input means for driving (speed) of the peeler rotation motor, and the like are arranged together as appropriate in an input operating section 5 that is formed on the top surface of the tower housing section 2b. The control unit 200 is configured to be capable of changing setting content that is required for driving, through the input means.

In addition, the peeling device 1 includes configurations that are required in typical electrical devices, such as electrical wiring (not shown) and a power supply switch 7 for supplying electric power to the peeler rotation motor, the shaft rotation motor, the fruit and vegetable rotation motor 167, and the rotation amount detecting means.

Next, driving control of the peeling device according to the present embodiment when peeling of a pineapple is performed will be described.

First, the peeling device is placed on a table. A main power supply is turned on. The peeling device enters a standby state for an ON operation of an operation switch for peeling.

Then, the barrel-shaped pineapple is impaled on the fruit and vegetable pin 163 of the fruit and vegetable holder 161, and held. At this time, a center of gravity (core portion) of the pineapple fruit is pierced by the fruit and vegetable pin 163.

When the pineapple fruit is held by the fruit and vegetable holder 161, the ON operation of the operation switch is performed. At this time, according to the present embodiment, the peeler 101 is in a state in which, at the point-of-origin position (six o'clock direction in FIG. 6), the peeler arms 103 hang downward from the peeler attachment plate 105 via the hinges 104, and tensile force of the coil spring 148 is not acting. The tilt restricting section 108 of the peeler 101 and the cam section 143 of the tip flange section 142 that configure the tilt restricting means 120 are also engaged.

Here, further switch operation of the operation switch during the peeling operation controls driving as a peeling stop operation (OFF operation).

When the ON operation is detected, the control unit 200 drives the fruit and vegetable rotation motor 167. The driving force of the fruit and vegetable rotation motor 167 is transmitted from the rotation shaft 167a thereof to the fruit and vegetable rotation shaft 165 via driving systems 168, 169, and 166, and the pineapple fruit rotates together with the fruit and vegetable holder 161.

Figure 6:
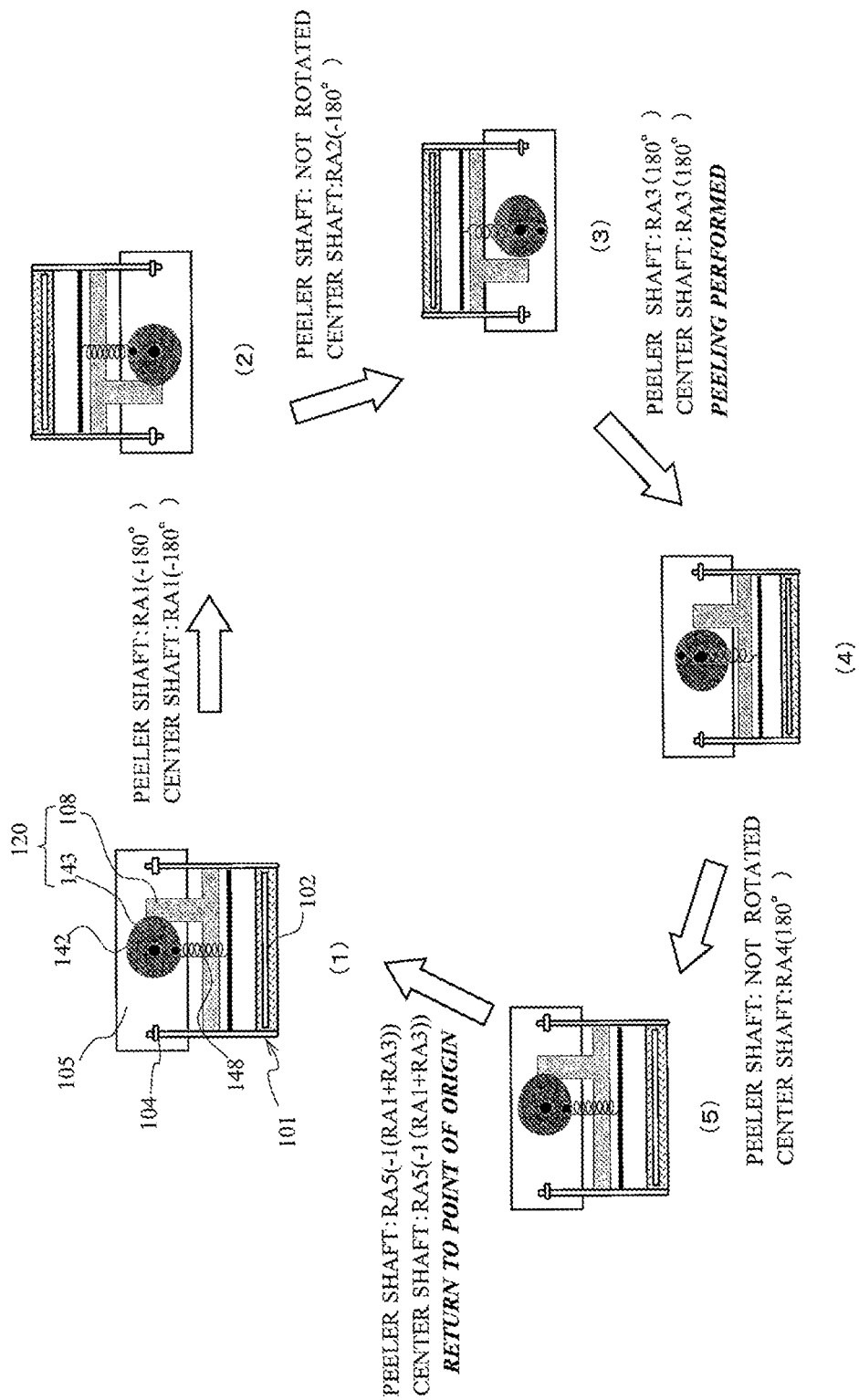
FIG. 6 is an explanatory diagram of rotation control of a peeler shaft and a center shaft during a peeling operation in the peeling device according to the first embodiment of the present invention, in which (1) shows a state in which tilting of the peeler is suppressed at a point-of-origin position, (2) shows a state in which the tilting of the peeler is suppressed at a peeling start angle, (3) shows a state in which suppression of the tilting of the peeler is canceled at the peeling start angle (peeler blade is in contact), (4) shows a state in which suppression of the tilting of the peeler is canceled at a peeling end angle (peeler blade is in contact), and (5) shows a state in which the tiling of the peeler is suppressed at the peeling end angle (peeler blade is separated).

In addition, the control unit 200 drives the peeler rotation motor and the shaft rotation motor while electrically synchronizing the peeler rotation motor and the shaft rotation motor. As shown in FIG. 6 (some reference numbers are omitted), the driving force of the peeler rotation motor is transmitted to the peeler shaft 111 via the driving systems 113 and 114, such as the driving shaft thereof. The peeler 101 is rotated from the point of origin by about first angle RA1 (180° according to the present embodiment) in a counter-clockwise direction in a state in which the peeler 101 is opposing the peeler driving section 100. In addition, the driving force of the shaft rotation motor is transmitted to the center shaft 141 via driving systems 144 and 145, such as the driving shaft thereof. The tip flange plate 142 is rotated from the point of origin by about the first angle RA1 (180° according to the present embodiment) in the counter-clockwise direction in a state in which the tip flange plate 142 is opposing the peeler driving section 100. The first angle is an angle for placing the peeler 101 in contact with the pineapple fruit and, further, adjusting pressure of the contact, as described above. The first angle refers to an angle from the point of origin and is an angular position at which peeling is started. Here, respective rotation of the peeler rotation motor and the shaft rotation motor is controlled based on the detection results of the respective rotation amount detecting means provided in the peeler shaft 111 and the center shaft 141.

As a result of the rotation, the peeler 101 moves to an angular position at which peeling is started above the pineapple fruit that supported by the fruit and vegetable holder 161. However, in this state, the tilt restricting section 108 suppresses the peeler 101 from taking on a tilted attitude in which the peeler blade 102 is tilted downward by the own weight of the peeler 101.

Next, the control unit 200 drives only the shaft rotation motor and further rotates the center shaft 141 by only second angle RA2 (180° according to the present embodiment) in the counter-clockwise direction. The second angle is a rotation angle difference between the peeler shaft 111 and the center shaft 141.

As a result of the rotation, engagement between the cam section 143 of the tip flange plate 142 and the tilt restricting section 108 of the peeler 101 is canceled. In addition, the coil spring 148 that is stretched between the urging member engaging section 107 of the peeler 101 that is held by the peeler shaft 111 and the urging member connecting section 147 of the tip flange plate 142 is stretched to maximum, and exerts a strong tensile force that draws the tip end side of the peeler 101 to the virtual axial line of the peeler shaft 111. The peeler 101 swings at the portion of the hinges 104 of the peeler arms 103 as a result of the tensile force and the own weight thereof, and presses the peeler blade 102 to a portion of the rotating pineapple fruit that is positioned near the holder main body 162.

In this state, the control unit 200 electrically synchronizes and drives the peeler rotation motor and the shaft rotation motor, and rotates by about third angle RA3 (180° according to the present embodiment) in a clockwise direction. The peeling is performed during the rotation of the peeler shaft 111. At this time, the rotation angle difference between the center shaft 141 and the peeler shaft 111 does not change. Therefore, the state (pressure) in which the peeler 101 is in contact with the pineapple fruit does not change. The third angle refers to a movement angle of the peeler blade 102 on a rotation trajectory (arc) thereof in a state in which the peeler 101 is in contact with the pineapple fruit.

According to the present embodiment, at this time, the tension state of the coil spring 148 that presses the peeler 101 to the pineapple fruit does not significantly change because the center shaft 141 rotates together with the peeler shaft 111. Therefore, the state in which the peeler 101 is pressed against the pineapple fruit can be maintained, and the flesh is not particularly damaged. In addition, the peeler blade 102 of which a contact position in relation to the pineapple fruit gradually moves downward by the rotation of the peeler shaft 111 continuously continues to peel the skin of the pineapple that is rotating by the rotation of the fruit and vegetable rotation shaft 164a, while waiting on a counter-peeler driving section arrangement side in relation to a virtual axial line of the fruit and vegetable holder 161.

At this time, as shown in FIG. 5, the trajectory of the peeler blade 102 of the peeling device 1 according to the present embodiment is Q'-Q-Q". As a result of the trajectory of the peeler blade 102 being positioned on a back side of the pineapple fruit when viewed from the peeler driving section side that is a projection viewpoint (specifically, an arm fulcrum) P, that is, the counter-peeler driving section arrangement side in relation to the virtual axial line of the fruit and vegetable holder 161 in this manner, the peeler blade 102 can peel the pineapple fruit while reliably and appropriately cutting into the skin of the pineapple fruit.

To describe further, as indicated by a curved line O-R-Q" in FIG. 5, the trajectory of the peeler blade 102 being before the axial line O means that the peeler blade 102 moves such as to slide on the surface side of the fruit or vegetable at all times, from the projection viewpoint P from the peeler driving section 100 side.

Figure 7:
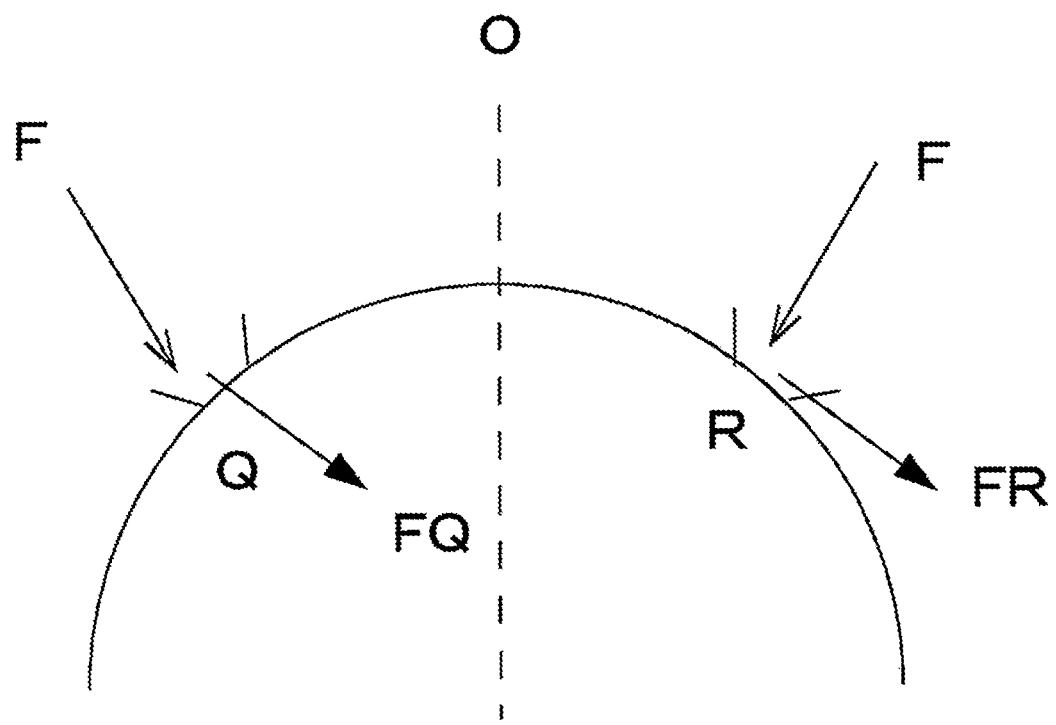
FIG. 7 is an explanatory diagram of a direction of force that acts on the peeler blade in the peeling device according to (lie first embodiment of the present invention, in which FR indicates force that acts in a direction in which the peeler blade slides (strokes a surface) and FQ indicates force that acts in a direction in which the peeler blade cuts into a surface.

That is, as shown in FIG. 7, only pressing force F of the coil spring 148 acts on the peeler blade 102. An acting direction of the pressing force F is that in which the peeler blade 102 is in a counter-center direction FR from the fruit or vegetable. Therefore, to improve this cut-in force, there was no method other than strengthening the coil spring 148. However, as described above, the coil spring 148 that has too strong of a tensile force also acts in the direction in which the fruit or vegetable moves away from the peeler blade 102. Therefore, the cut-in force does not simply increase, and delicate flesh becomes damaged.

In this regard, the trajectory Q'-Q-Q" of the peeler blade 102 according to the present embodiment is positioned on the back side of the pineapple fruit when viewed from the projection viewpoint P from the peeler driving section 100 side, that is, the counter-peeler driving section arrangement side in relation to the virtual axial line of the fruit and vegetable holder 161. Therefore, force of the peeler arms 103 works in a direction that holds the pineapple fruit (a center direction of the fruit or vegetable) FQ. Therefore, the cut-in force of the peeler blade 102 also acts in the direction in which the peeler blade 102 cuts into the pineapple fruit. Therefore, even when the tensile force of the coil spring 148 is not strengthened, because the peeler blade 102 itself cuts into the pineapple fruit, damage to the flesh of the pineapple fruit can be prevented.

Next, the control unit 200 drives the shaft rotation motor and rotates the center shaft 141 by fourth angle RA4 (180° according to the present embodiment) that is the same angle as the second angle RA2 in the opposite direction thereof (that is, the clockwise direction). The control unit 200 relaxes the tension state of the coil spring 148 that presses the peeler 101 against the pineapple fruit, and cancels contact of the peeler 101 with the pineapple fruit. As a result, the center shaft 141 also returns to the point-of-origin position (six o'clock direction). At this time, the tilt restricting section 108 of the peeler 101 and the cam section 143 of the tip flange plate 141 that configure the tilt restricting means 120 are engaged again.

In addition, both the peeler shaft 111 and the center shaft 141 are returned to the point-of-origin position. For example, the control unit 200 electrically synchronizes and drives the peeler rotation motor and the shaft rotation motor, and rotates by fifth angle RA5 (0° according to the present embodiment) in which a difference angle between the first angle RA1 in the counter-clockwise direction and the third angle RA3 in the clockwise direction is 0 degrees. As a result, the peeler shaft and peeler are returned to the point-of-origin position (six o'clock direction).

Next, the control unit 200 stops driving of the fruit and vegetable rotation motor 167.

Then, after the peeled pineapple fruit is recovered from the fruit and vegetable holder 161, if the peeling work is to be continued, the next pineapple fruit is impaled onto the fruit and vegetable pin 163, and the series of operations for performing the ON operation of the operation switch is repeated.

The peeling device according to the present embodiment that is configured in this manner is capable of orienting the direction of the force that acts on the peeler blade 102 of the peeler 101 towards the inner side of the fruit or vegetable, at all times. Therefore, the peeler blade 102 cutting into the fruit or vegetable can be assisted. Consequently, peeling can be reliably performed even for a fruit or vegetable that has hard skin, such as a pineapple.

In addition, in the peeling device according to the present embodiment, the discarded amount of skin and the like as a result of peeling can be minimized. Specifically, compared to when the skin and the core portion of the pineapple fruit are removed by a cutter that includes an inner blade and an outer blade that are circular cylinders, as described above, an average of 35% more flesh can be acquired.

Figure 8:
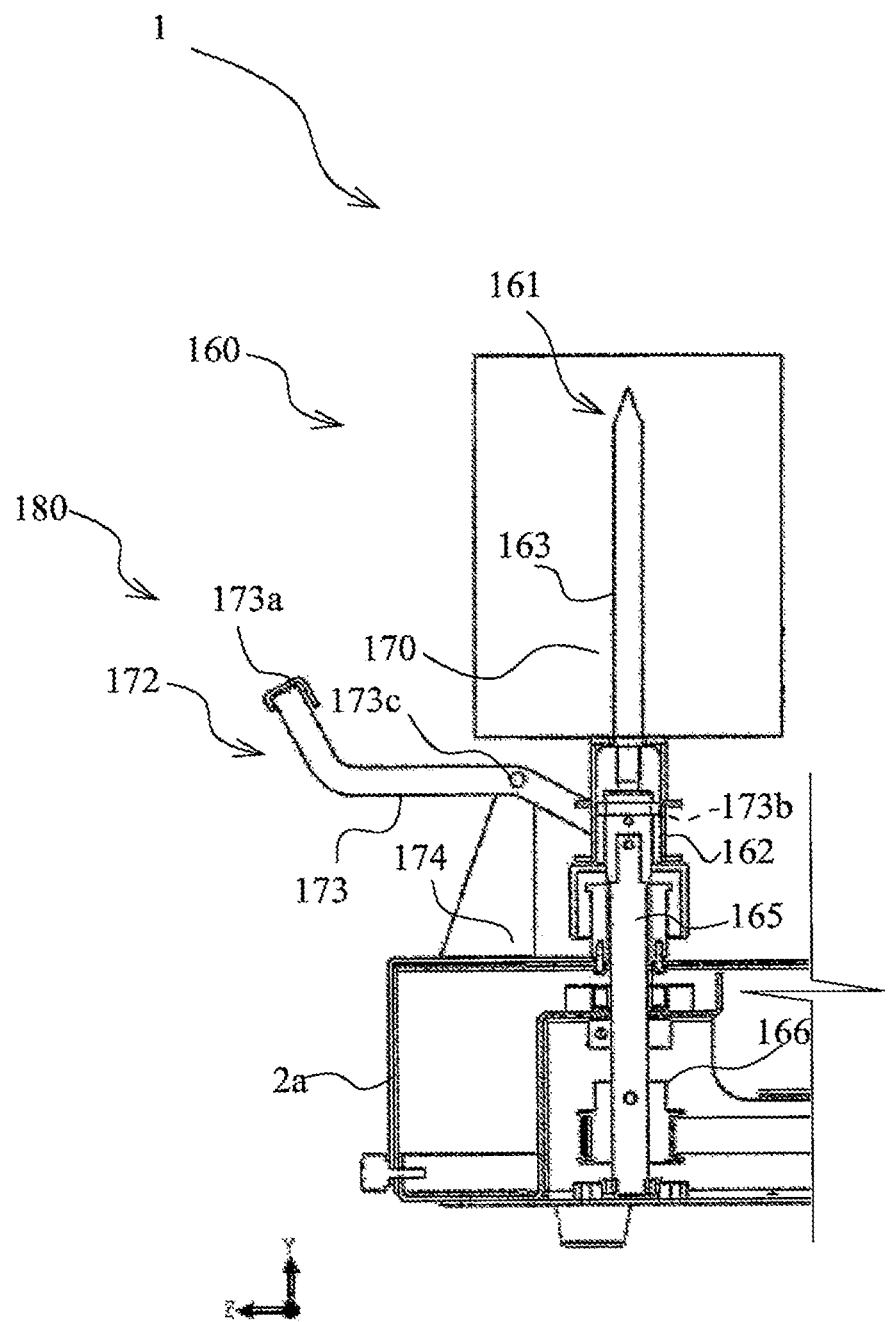
FIG. 8 is a vertical cross-sectional view of main sections of a removal mechanism during driving of a peeling device according to a second embodiment of the present invention.
Figure 9:
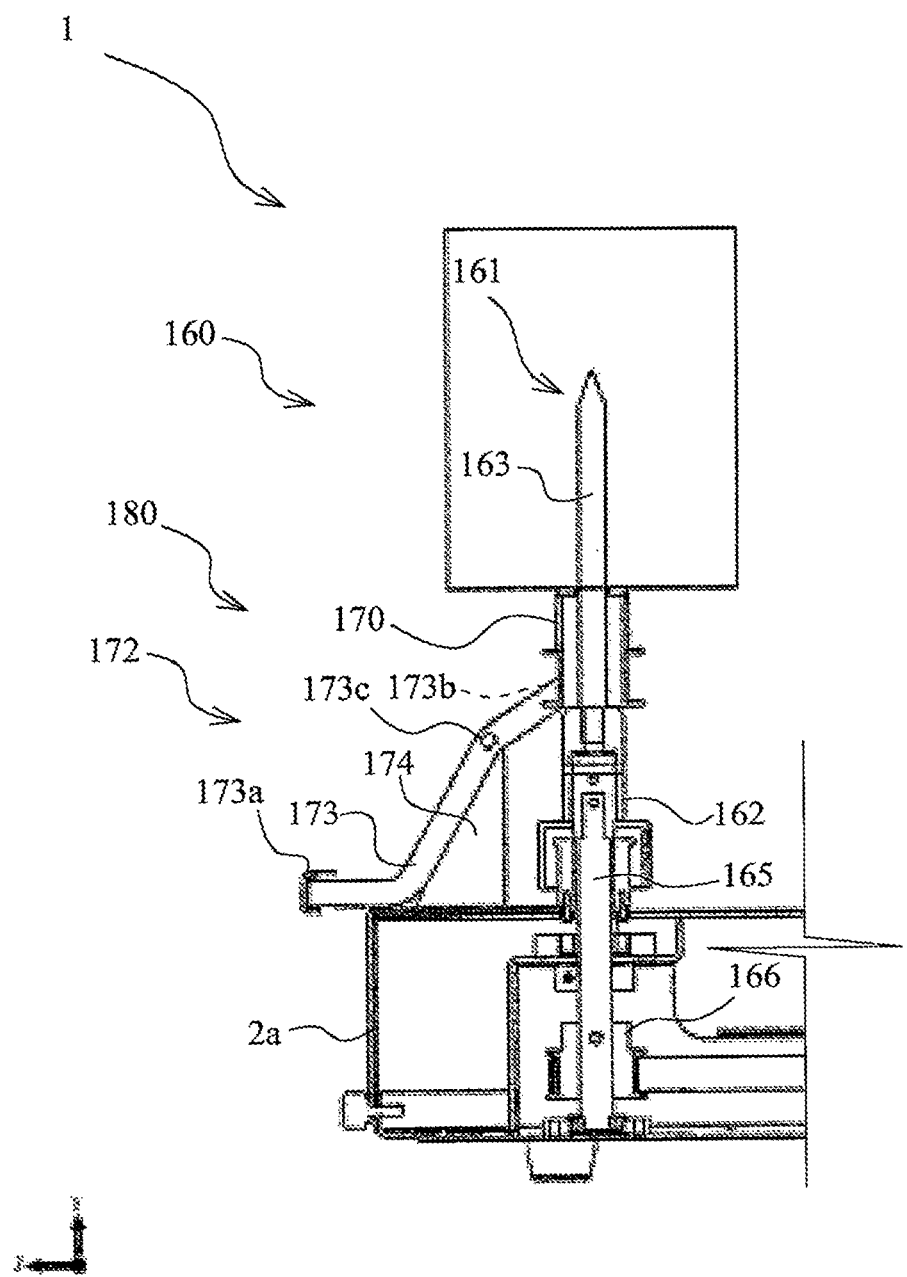
FIG. 9 is a vertical cross-sectional view of the main sections of the removal mechanism during removal after peeling in the peeling dev ice according to the second embodiment of the present invention.

In addition, FIG. 8 and FIG. 9 show a section of a peeling device according to a second embodiment for peeling the above-described pineapple fruit. The peeling device according to the present embodiment mainly differs from the peeling device according to the first embodiment in that a removal mechanism 180 for easily removing the pineapple fruit that is impaled on the fruit and vegetable pin 163 from the fruit and vegetable pin 163 is provided. Other configurations are basically the same.

The fruit and vegetable holder 161 according to the present embodiment includes, instead of the circular disk-shaped pin base 164 that is formed in the holder main body 162 according to the first embodiment, a cap-shaped fruit and vegetable mounting member 170 that is fitted onto the holder main body 162 from above and freely moves in a sliding manner in an upward/downward direction by sliding over the outer periphery of the holder main body 162. The fruit and vegetable pin 163 is erected such as to be freely detachable in the center of the upper portion of the holder main body 162 that is connected to the fruit and vegetable rotation shaft 165, and protrudes such as to freely rotate inside an opening in the center of an upper surface of the fruit and vegetable mounting member 170 that is fitted onto the holder main body 162. Here, FIG. 8 and FIG. 9 show the fruit and vegetable pin 163 that has an H-shaped lateral cross-section. However, the shape of the fruit and vegetable pin 163 is not limited thereto. The fruit and vegetable pin 163 may be a pin that has a shape that achieves holding force that is sufficient for peeling and does not easily damage the fruit to be peeled, such as the cross-shaped sword-like pin according to the first embodiment.

The fruit and vegetable mounting member 170 is provided with a slide operating section 172 for moving the fruit and vegetable mounting member 170 in a sliding manner along the outer periphery of the holder main body 162. According to the present embodiment, the slide operating section 172 is a lever member 173 that moves the fruit and vegetable mounting member 170 up and down in a sliding manner, using the principle of leverage. That is, in the lever member 173, an open end is an operating section 173A that is operated by an operator, and the other end is a fixed section 173B that is connected to the fruit and vegetable mounting member 170 by a rotation connecting section (not shown), such as to freely rotate. In the middle between both ends is a swing supporting section 173C that is supported such as to freely rotate by a stay member 174 that is vertically provided on the upper surface of the base housing section 2a.

In addition, according to the present embodiment, the fruit and vegetable mounting member 170 and the slide operating section 172 configure the removal mechanism 180. That is, in the peeling device according to the present embodiment, the center of gravity (core portion) of the barrel-shaped pineapple is impaled onto the fruit and vegetable pin 163 that protrudes from the upper surface of the fruit and vegetable mounting member 170, and the bottom end of the pineapple fruit is held such as to be in contact with the upper surface of the fruit and vegetable mounting member 170.

At this time, the fruit and vegetable mounting member 170 is pressed downward when the pineapple fruit is impaled onto the fruit and vegetable pin 163, and moves in a sliding manner to a bottommost position while sliding over the outer periphery of the holder main body 162. In accompaniment with the downward sliding movement the fruit and vegetable mounting member 170, that is, the downward pressing operation of the fixed section 173B of the lever member 173, the lever member 173 swings with the swing supporting section 173C as a fulcrum point, and as shown in FIG. 8, raises the operating section 173A on the open end. In this state, peeling of the pineapple fruit is performed as described above. At this time, the holder main body 162 that supports the fruit and vegetable pin 163 rotates inside the fruit and vegetable mounting member 170. Therefore, the pineapple fruit that is impaled on the fruit and vegetable pin 163 also rotates and is provided for peeling.

Then, when the peeling of the pineapple fruit is completed, as shown in FIG. 9, the operating section 173A on the open end of the lever member 173 is pressed downward. As a result of this operation, the lever member 173 swings with the swing supporting section 173C as the fulcrum point and the fixed section 173B is raised high.

As a result, the pineapple fruit of which peeling has been completed is lifted in a direction in which the pineapple fruit is removed from the fruit and vegetable pin 163 by the fruit and vegetable mounting member 170 that rises while sliding over the outer periphery of the holder main body 162.

In the peeling device according to the present embodiment that includes the removal mechanism 180, when the pineapple fruit is impaled onto the fruit and vegetable pin 163, the fixed section 173B works as a point of force and the operating section 173A works as a point of action. Conversely, when the pineapple fruit on the fruit and vegetable mounting member 170 is removed from the fruit and vegetable pin 163, the operating section 173A works as the point of force and the fixed section 173B works as the point of action. As a result, the fruit or vegetable to be peeled is easily impaled onto and removed from the fruit and vegetable pin 163.

The work of removing the pineapple fruit of which the center of gravity is pierced by the fruit and vegetable pin 163 from the fruit and vegetable pin 163 requires significant force. In particular, during an initial motion of removing the pineapple fruit from the fruit and vegetable pin 163, momentum and force are required. However, as a result of the removal mechanism 180 being provided in the holder main body 162 as described above and the work of the initial motion of removing the pineapple fruit from the fruit and vegetable pin 163 being assisted, the overall work of removing the pineapple fruit from the fruit and vegetable pin 193 can be simplified.

In addition, the peeled pineapple fruit is naturally softer than a pineapple that has skin, and the fruit tends to overflow. However, as a result of the removal mechanism 180 being provided, a situation in which the pineapple fruit is gripped by a strong force during the initial motion of removal from the fruit and vegetable pin 162 and damaged can be prevented.

As described above, according to the present embodiment, the pineapple fruit is slightly moved in the direction of removal from the fruit and vegetable pin by the removal mechanism 180, and the initial motion of the work of removing the pineapple fruit from the fruit and vegetable pin 163 is assisted. Depending on the length of the fruit and vegetable pin 163 and the size of the object to be peeled, the fruit or vegetable to be peeled can be removed from the fruit and vegetable pin 163 by only the operation of the removal mechanism 180.

Here, the diameter dimensions of the holder main body 162 and the fruit and vegetable mounting member are designed in a manner similar to that according to the first embodiment, such as to be sufficient for holding the pineapple fruit, but sufficiently smaller than the minimum diameter of the barrel-shaped pineapple fruit, and such that neither the holder main body 162 nor the fruit and vegetable mounting member interferes with the peeler blade 102 of the peeler 101 during peeling.

Here, the present invention is not limited to the above-described embodiments. Various modifications are possible to an extent that characteristics of the present invention are not compromised.

For example, regarding the fruit and vegetable rotation motor 167, a rotation speed thereof can be adjusted by an input signal that is transmitted to the control section 200 from the input operating section 5. As a result of a blade-advancing (peeler shaft rotation) speed being changed by such a software-based adjustment means, peeling thickness can be changed. As an initial setting, the rotation of the fruit and vegetable rotation motor 167 may be controlled to about 200 revolutions per minute. While the pineapple fruit rotates about 20 to 40 times, the peeler blade 102 may perform peeling from the upper portion side of the fruit or vegetable that is supported by the fruit and vegetable holder 161, on the counter-peeler driving section arrangement side in relation to the virtual axial line of the fruit and vegetable holder 161.

In addition, the first angle to fourth angle can be set as appropriate. However, the second angle and the fourth angle are angles that tighten and relax the coil spring. Therefore, the second angle and the fourth angle are preferably 180°. Rotation by the fifth angle RA5 is essentially omitted when the first angle and the third angle are the same angle as according to the present embodiment.

Furthermore, the tilt restricting means 120 of the present invention is not limited to the configuration that includes the cam section 143 of the tip flange plate 142 and the tilt restricting section 108 of the peeler 101 according to the present embodiment. For example, a configuration in which tilting of the peeler 101 is suppressed through use of a shaft that advances and retreats by driving of an actuator is also possible.

Furthermore, regarding the removal mechanism 180 of the present invention as well, the means for moving the fruit and vegetable mounting member 170 in a sliding manner in the upward/downward direction along the holder main body 162 is not limited to the configuration using the lever member 173, as described above.

We claim:
1. A peeling device comprising:
a fruit and vegetable supporting section in which a fruit and vegetable holder that supports a fruit or vegetable to be peeled is arranged such as to freely rotate by driving of a fruit and vegetable rotation motor;
a peeler driving section that includes a peeler shaft that moves a peeler along an outer periphery of the fruit or vegetable that is supported by the fruit and vegetable holder by driving of a peeler rotation motor, and a center shaft that is inserted into the peeler shaft and arranged coaxially with the peeler shaft, in which a tip flange plate that is provided on one end that faces further towards the fruit and vegetable supporting section side than the peeler shaft is provided with an urging member between the center shaft and the peeler, and the center shaft rotates by driving of a shaft rotation motor; and
a control unit that controls driving of the fruit and vegetable rotation motor, the peeler rotation motor, and the shaft rotation motor, characterized in that
a peeler blade is made to swing such as to come into contact with and separate from a virtual axial line of the peeler shaft by a tension state of the urging member being adjusted based on a rotation angle difference between the peeler shaft and the center shaft, and peeling is performed from an upper portion side of the fruit or vegetable that is supported by the fruit and vegetable holder, on a counter-peeling driving section arrangement side in relation to a virtual axial line of the fruit and vegetable holder,
in the peeler, a pair of peeler arms that support the peeler blade and have an arm-like shape are swingably connected by a pair of hinges to a peeler attachment plate that is arranged in the peeler shaft; and the peeler driving section includes a tilt restricting means that is capable of restricting tilting of the peeler during non-contact with the fruit or vegetable,
the tilt restricting means is composed of a tilt restricting section that is provided in the peeler and a cam section of the tip flange plate that is capable of engaging with the tilt restricting section; and when the peeler shaft and the center shaft are rotated in a state in which the tilt restricting section and the cam section are engaged, and the peeler blade moves above a peeling start position on the fruit or vegetable that is supported by the fruit and vegetable holder, the peeler driving section rotates only the center shaft, cancels the engagement between the tilt restricting section and the cam section, and makes the peeler blade of the peeler approach the virtual axial line of the peeler shaft by the urging member.

2. The peeling device according to claim 1, characterized in that:
the fruit and vegetable holder includes a holder main body in which a fruit and vegetable pin is connected to one end in an upper portion of a housing of a fruit and vegetable rotation shaft that is erected such as to freely rotate in the housing in which the fruit and vegetable supporting section is arranged, and a fruit and vegetable mounting member that is arranged such as to freely slide in an upward/downward direction of the holder main body, in which the fruit and vegetable pin protrudes such as to freely rotate from a center of an upper surface thereof, and with which a bottom end of the fruit or vegetable to be peeled that is impaled on the fruit and vegetable pin comes into contact; and
a removal mechanism for removing the fruit or vegetable from the fruit and vegetable pin is configured by the fruit and vegetable mounting member and a slide operating section that moves the fruit and vegetable mounting member in a sliding manner in the upward/downward direction of the holder main body.

3. The peeling device according to claim 2, characterized in that:
the slide operating section is a lever member in which an open end is an operating section, the other end is a fixed section that is connected to the fruit and vegetable mounting member by a rotation connecting section such as to freely rotate, and in the middle of both ends is a swing supporting section that is supported by the housing in which the fruit and vegetable holder is provided.

* * * * *